United States Patent [19]

Rudolph

[11] Patent Number: 5,305,991

[45] Date of Patent: Apr. 26, 1994

[54] HYDRAULICALLY DAMPED SLEEVE BEARING

[75] Inventor: Axel Rudolph, Bensheim, Fed. Rep. of Germany

[73] Assignee: Firma Carl Freudenberg, Weinheim, Fed. Rep. of Germany

[21] Appl. No.: 884,694

[22] Filed: May 18, 1992

[30] Foreign Application Priority Data

May 21, 1991 [DE] Fed. Rep. of Germany ....... 4116577

[51] Int. Cl.$^5$ ............................................. F16F 13/00
[52] U.S. Cl. .................... 267/140.12; 248/562
[58] Field of Search ............... 267/140.12, 220, 140.5, 267/35, 141.2; 248/562, 566, 638

[56] References Cited

U.S. PATENT DOCUMENTS

| 3,888,449 | 6/1975 | Jablonski et al. | 267/140.12 X |
| 5,026,031 | 6/1991 | Court | 267/140.12 |

FOREIGN PATENT DOCUMENTS

| 0009120 | 2/1980 | European Pat. Off. | |
| 3831644 | 3/1990 | Fed. Rep. of Germany | 267/140.12 |
| 88245 | 5/1983 | Japan | 248/638 |
| 134434 | 5/1990 | Japan | 267/220 |
| 3-020138 | 1/1991 | Japan | 267/140.12 |
| 2208312 | 3/1989 | United Kingdom | 267/140.12 |

Primary Examiner—Robert J. Oberleitner
Assistant Examiner—Kevin D. Rutherford
Attorney, Agent, or Firm—Kenyon & Kenyon

[57] ABSTRACT

A hydraulically damped sleeve bearing having two supporting structures which are arranged essentially parallel to a common axis and are connected by a spring member made of a rubber-elastic material. The spring member has at least one liquid-filled chamber pair that is connected through a damping opening and whose chambers are configured at right angles to the axis so that they are opposite to each other. The spring member is furnished with recesses, which are molded during production and are open in the direction of an axial front end, and the recesses are sealed by a subsequently installed lid-locking device. The lid-locking device is connected to one of the supporting structures and is movable relative to the other supporting structure.

7 Claims, 1 Drawing Sheet

HYDRAULICALLY DAMPED SLEEVE BEARING

BACKGROUND OF THE INVENTION

FIELD OF THE INVENTION

The present invention relates to a hydraulically damped sleeve bearing having two supporting structures which surround each other and are arranged parallel to a rotation axis. The supporting structures are braced flexibly against each other by means of a spring member made of a rubber-elastic material. The spring member has at least one liquid-filled chamber pair that is connected through a damping opening. The chambers are configured at right angles to the axis so that they are opposite to one another.

DESCRIPTION OF THE RELATED ART

A sleeve bearing is disclosed in EPO 009 120. In this device, the chambers of the chamber pairs are formed as recesses in the spring member. Because of the manner in which the spring member is manufactured, the chambers are open to the outside in the radial direction and must be sealed by sliding the inner supporting structure, including the spring member, into an outer tube which is impervious to liquid. This is done after the chambers are filled with liquid. To ensure that the spring member is fixed with respect to the outer tube, it is necessary to sheathe the spring member with an inflexible end-window tube in the area of the spring member's outer surface. The manufacturing and installation of the end-window tube is difficult, and therefore this arrangement is disadvantageous.

SUMMARY OF THE INVENTION

The object of the present invention is to provide a sleeve bearing of the type mentioned above that will be simple to manufacture and install.

In the sleeve bearing of the present invention, the spring member is furnished with recesses that are molded during production of the spring member and that are open in the direction of axial front end of the bearing. The recesses are sealed by a subsequently installed lid-locking device, which is connected to one of the supporting structures and is movable relative to the other supporting structure. As a result, there is no need to use an end-window tube.

The spring member can have two chamber pairs arranged to mate in the circumferential direction. The two chamber pairs are formed by recesses with mutually opposed openings and are sealed by at least two lid-locking devices. The two chamber pairs can be connected by damping openings, whose dimensional designs deviate from one another, or can be defined by chamber walls, whose elasticity deviates from one another. Damping properties result which vary in at least two axially normal directions which are perpendicular to one another. Depending upon the actual direction of relative movement, one or the other damping action is proportionally stronger.

The permeability of each damping opening can be modified by a valve so as to allow the permeability to be changed in both directions. This allows damping action to be attained within a wide frequency range if, for example, the damping opening has a duct-type design. Improved insulation from acoustically disturbing vibrations is achieved using a partition wall, which is able to move easily back and forth, between the two chambers of a chamber pair. This partition wall can be arranged between end stops or optionally in a subsection of the damping opening.

The sleeve bearing of the present invention is easily manufactured because the damping opening which connects the chambers is in the vicinity of the orifice of the recesses, when the recesses are limited in the axial direction by the lid-locking device. Consequently, in the molding and hardening of the spring member, tools can be used which are free of undercuts and therefore are particularly easy to use.

In one embodiment, at least one chamber pair is provided in which the first chamber is supported in the axial direction at least in part in front of a significant part of the profile of the spring member, and in which the second chamber and the profile of the spring member extend in the axial direction essentially parallel to one another, each with respect to a coinciding radial plane. When only one chamber pair is used, which can be connected by one damping opening, a damping action results which occurs not only when there is a radial relative displacement of the supporting structures connected by the spring member, but also when there is an axial relative displacement. This is a considerable advantage for numerous applications.

In this type of sleeve-bearing design, it has proven worthwhile for the first chamber to be formed by a recess that extends in the radial direction with a pocket prolongation under the profile of the spring member in the vicinity of the supporting structure carrying the lid-locking device. As a result, radial relative displacements of the supporting structures of a low amplitude can be insulated particularly well.

An even better insulation of high-frequency vibrations, which are introduced in the radial direction, is attained when the second chamber is surrounded by a membrane that is part of the spring member and the membrane is separated from the rest of the spring member, in the non-loaded state of the sleeve bearing, by a clearance. In such a design, the second chamber is suited for the nonpressurized accommodation of additional liquid volumes from the first chamber. Thus, during normal operational use, it assumes the function of a compensating chamber for the single-chamber hydrobearing.

The spring member can be provided with an extension, which at least partially covers at least one of the supporting structures on the side turned away from the other supporting structure. The extension can have a layer-type construction. Not only does this extension provide excellent protection against corrosion for the supporting structure it covers, but moreover it can simplify its location in a female machine part.

An important mounting aid can be provided when at least one of the supporting structures has at least one flexible securing claw which projects in the radial direction. Such a mechanism could be, for example, a securing screw for a secondary machine part, which would act as a mechanism to protect against loss. The securing claw can consist of a rubber-elastic material and, as a result, can easily be locked into an undercut of a machine part to be retained.

Using simple tools, the sleeve bearing according to the invention is able to be manipulated and manufactured quite inexpensively. It can be easily adapted to special conditions of the specific application case by slightly modifying the tools that are used.

BRIEF DESCRIPTION OF THE DRAWINGS

The invention shall be clarified in greater detail in the following on the basis of the enclosed drawings.

DESCRIPTION OF THE PREFERRED EMBODIMENT

Figure 1:
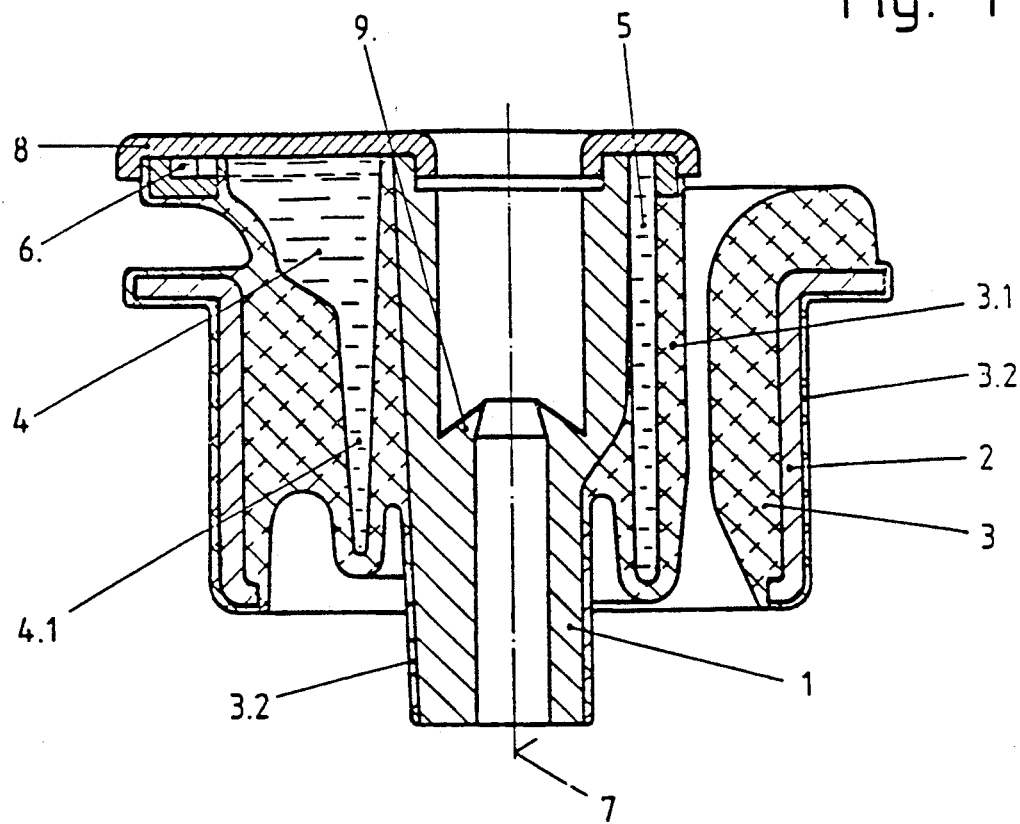
FIG. 1 shows the sleeve bearing of the present invention in longitudinal cross-section.
Figure 2:
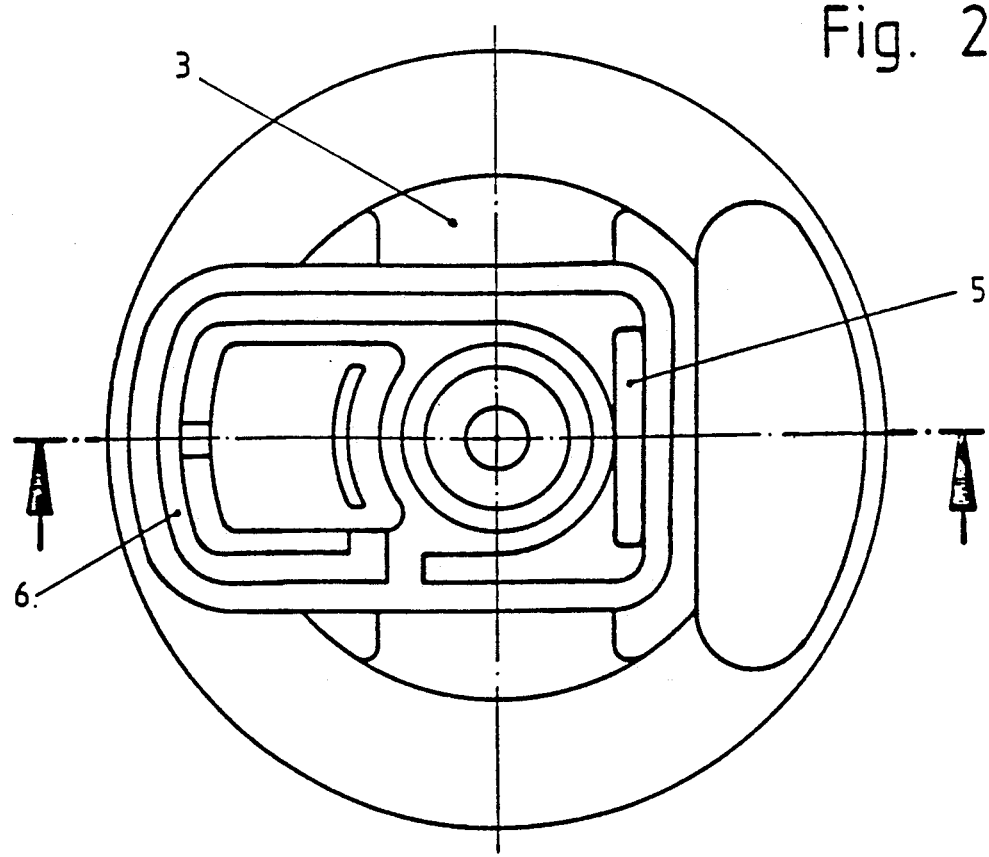
FIG. 2 shows the sleeve bearing according to FIG. 1 in a top view, with the lid-locking device removed.

The sleeve bearing depicted in FIGS. 1 and 2 includes two supporting structures 1, 2 made of a metallic material. The support structure 2 surrounds the support structure 1, and both structures are arranged essentially parallel to an axis 7. The support structures 1, 2 are braced flexibly against each other by means of a spring member 3 made of a rubber-elastic material. The spring member 3 contains one liquid-filled chamber pair 4, 5 which is connected by a damping opening 6. The chambers 4, 5 are configured at right angles to the axis 7 and are opposite one another. The chambers 4, 5 are formed by recesses produced during the molding and hardening of the spring member 3. The chambers 4, 5 are open in the direction of an axial front end of the spring member 3. A molded component is formed in one piece with the inner supporting structure 1 and surrounds the damping opening 6. The damping opening 6 connects the chambers 4, 5 and, depending on how it is manufactured, is open axially in the same direction as the chamber 4, 5. The damping opening 6 and the chambers 4, 5 are completely filled with a hydraulic fluid, for example a mixture of glycol and water. The chambers 4, 5 and the damping opening 6 are sealed fluid-tight in the direction of the front end by a lid-locking device 8. The lid-locking device 8 is fixed on the inner supporting structure 1 and is movable relative to the outer supporting structure 2.

The chambers 4, 5 have shapes which differ from one another. The first chamber 4 is supported in the axial direction in front of a significant part of the profile of the spring member 3, while in the vicinity of the second chamber 5, its profile and the profile of the spring member 3 extend parallel to one another in the axial direction. The second chamber 5 is bounded by a membrane 3.1. When the sleeve bearing is in a non-loaded state, there is a clearance between membrane 3.1 and an opposite surface of the spring member 3, which acts as a limit stop. As a result, the second chamber 5 can accommodate additional liquid volume without pressurization.

When the inner supporting structure 1 shifts relative to the outer supporting structure 2 in a plane at right angles to the axis 7, the relative movement will cause liquid components to be forced through the damping opening 6. This is because one or the other of chambers 4 and 5 will decrease in size, pressurizing the liquid in this chamber and forcing it through the damping opening 6 into the other chamber. The relative displacement of the liquid will be into the chamber 4 or 5 which is of comparatively lower pressure. The damping opening 6 is dimensioned so that the relative movement causes a damping effect.

If, on the other hand, the inner supporting structure 1 shifts with respect to the outer supporting structure 2 in a plane parallel to the axis 7, then the relative movement will cause only the first chamber 4 to be enlarged or reduced, not the second chamber 5. As a result, the corresponding volumetric differential of chamber 4 is displaced through the damping opening 6 either into of out of the second chamber 5. Either movement causes a damping action. In the pictured embodiment, the second chamber 5 is surrounded by the membrane 3.1 which is part of the spring member 3. As discussed above, the membrane 3.1 is separated from the remainder of the spring member 3 in the depicted non-loaded state by a clearance. As a result, the second chamber 5 is suited for the nonpressurized accommodation or delivery of an additional liquid volume.

In the depicted embodiment, the first chamber 4 is a recess which has a pocket prolongation 4.1. The pocket prolongation 4.1 is in the vicinity of the supporting structure 1 which carries the lid-locking device 8. The pocket prolongation 4.1 is filled with hydraulic fluid, as are the two chambers 4, 5 and the damping opening 6. As a result, the inner supporting structure 1 is more easily moved in the radial direction relative to the outer supporting structure 2. This achieves good insulation with respect to correspondingly directed vibrations.

The spring member 3 can be provided with an extension 3.2, which at least partially covers at least one of the supporting structures 1, 2 on the side turned away from the other supporting structure. The extension can have a layer-type construction. This extension provides excellent protection against corrosion for the supporting structure it covers and can simplify the location of the support structure 2 in a female machine part.

At least one of the supporting structures 1, 2 can have at least one flexible securing claw 9 which projects in the radial direction. Although shown as a projecting member, such a mechanism could also be, for example, a securing screw. The securing claw is used to attach and hold a secondary machine part, which is connected to the support structure 1. The securing claw 9 can consist of a rubber-elastic material and, as a result, can easily be locked into an undercut of a machine part to be retained.

I claim:

1. A sleeve bearing comprising:
   two support structures, one of said support structures surrounding the other of said support structures, said support structures being parallel to a common axis;
   an elastic spring member located between the support structures, the spring member comprising at least one pair of recesses molded into the spring member, the recesses being connected by a damping opening, said recesses and said damping opening being open at an axial end, one of said recesses being defined by walls which are substantially parallel to the common axis and the other of said recesses is defined by at least one wall which is substantially non-parallel to the common axis; and
   at least one locking device connected to one of said support structures and movable relative to the other of said support structures, the locking device sealing the open end of said recesses and said damping opening to thereby retain said liquid.

2. The sleeve bearing of claim 1, wherein:
   the recesses are opposite to one another relative to the common axis.

3. The sleeve bearing of claim 1, wherein:
   the other of said recesses has a pocket prolongation located adjacent the supporting structure which is connected to the locking device.

4. The sleeve bearing of claim 1, wherein:

the walls substantially parallel to the common axis are separated from a portion of the spring member by a clearance when the sleeve bearing is in a non-loaded condition.

5. The sleeve bearing of claim 1, wherein:

the spring member further comprises an extension which covers a portion of one of the supporting structures.

6. The sleeve bearing of claim 1, wherein:

at least one of the supporting structures includes a flexible securing claw which projects in the radial direction for retaining a machine part.

7. A sleeve bearing comprising:

two support structures, one of said support structures surrounding the other of said support structures, said support structures being parallel to a common axis;

an elastic spring member located between the support structures, the spring member comprising at least one pair of recesses molded into the spring member, the recesses being connected by a damping opening, said recesses and said damping opening being open at an axial end, each said recess being defined by a circumferentially outer wall and a circumferentially inner wall, at least one of said circumferentially outer walls being separated from a portion of the spring member by a clearance when the sleeve bearing is in a non-loaded condition; and at least one locking device connected to one of said support structures and movable relative to the other of said support structures, the locking device sealing the open end of said recesses and said damping opening to thereby retain said liquid.

* * * * *